(12) United States Patent
Yamakami et al.

(10) Patent No.: US 7,520,927 B2
(45) Date of Patent: Apr. 21, 2009

(54) LIQUID INK FOR INK JET AND INK JET RECORDING METHOD USING THE INK

(75) Inventors: Hideki Yamakami, Yokohama (JP); Hiroshi Tomioka, Tokyo (JP); Hiroyuki Takuhara, Tokyo (JP); Yuuko Negishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 11/648,587

(22) Filed: Jan. 3, 2007

(65) Prior Publication Data
US 2007/0109378 A1  May 17, 2007

Related U.S. Application Data (63) Continuation of application No. PCT/JP2006/314007, filed on Jul. 7, 2006.

(30) Foreign Application Priority Data
Jul. 8, 2005 (JP) ............... 2005-199805

(51) Int. Cl.
*C09D 11/00* (2006.01)
*C09D 11/02* (2006.01)
*B41J 2/01* (2006.01)

(52) U.S. Cl. ............. 106/31.47; 106/31.58; 106/31.77; 106/31.86; 347/100

(58) Field of Classification Search ............. 106/31.58, 106/31.86, 31.49, 31.43, 31.75, 31.78, 31.47, 106/31.77, 31.48; 347/100
See application file for complete search history.

(56) References Cited

U.S. PATENT DOCUMENTS

| | | | | |
|---|---|---|---|---|
| 5,123,960 | A  * | 6/1992 | Shirota et al. | 106/31.46 |
| 6,488,752 | B1 * | 12/2002 | Kenworthy et al. | 106/31.48 |
| 6,874,881 | B2 | 4/2005 | Suzuki et al. | 347/100 |
| 7,025,817 | B2 * | 4/2006 | Kanke et al. | 106/31.51 |
| 7,208,033 | B2 * | 4/2007 | Kawabe et al. | 106/31.48 |
| 7,244,299 | B2 * | 7/2007 | Tsuji et al. | 106/31.48 |
| 7,282,090 | B2 * | 10/2007 | Osumi et al. | 106/31.47 |
| 2007/0107627 | A1* | 5/2007 | Negishi et al. | 106/31.27 |
| 2007/0109371 | A1 | 5/2007 | Tomioka et al. | 347/86 |

(Continued)

FOREIGN PATENT DOCUMENTS

EP  1626070  2/2006

(Continued)

OTHER PUBLICATIONS

English translation of JP 2003/138185; May 2003.*

(Continued)

*Primary Examiner*—Helene Klemanski
(74) *Attorney, Agent, or Firm*—Fitzpatrick, Cella, Harper & Scinto (57) ABSTRACT

There are provided: a liquid ink for ink jet including: water; a coloring material; 1,5-pentanediol; and a humectant, in which the content of 1,5-pentanediol is 3 mass % or more and 15 mass % or less, and the total of the content of 1,5-pentanediol and the content of the humectant is 10 mass % or more and 40 mass % or less; and an ink jet recording method using the ink.

3 Claims, 2 Drawing Sheets

U.S. PATENT DOCUMENTS

| | | |
|---|---|---|
| 2007/0109372 A1 | 5/2007 | Tomioka et al. .............. 347/86 |
| 2007/0109390 A1 | 5/2007 | Yamakami et al. .......... 347/105 |

FOREIGN PATENT DOCUMENTS

| | | |
|---|---|---|
| JP | 2942319 | 6/1999 |
| JP | 2002-504613 | 2/2002 |
| JP | 2003-138185 | 5/2003 |
| JP | 2003-138186 | 5/2003 |
| JP | 2003-165935 | 6/2003 |
| WO | 2004/104108 | 12/2004 |

OTHER PUBLICATIONS

PCT International Preliminary Report on Patentability in corresponding PCT Application No. PCT/JP2006/314007, dated Jan. 17, 2008, and English language translation thereof.

* cited by examiner

LIQUID INK FOR INK JET AND INK JET RECORDING METHOD USING THE INK

This application is a continuation of International Application No. PCT/JP2006/314007, filed Jul. 7, 2006, which claims the benefit of Japanese Patent Application No. 2005-199805, filed Jul. 8, 2005.

BACKGROUND OF THE INVENTION

1. Field of the Invention

The present invention relates to a liquid ink for ink jet having excellent ejection property and an ink jet recording method using the ink.

2. Description of the Related Art

An ink jet recording method is a recording method of applying a small ink droplet to any one of plain paper or glossy media to form an image, and has become rapidly widespread owing to reduction in costs and improvement in recording speed. In addition to improvement in the quality of images, as digital cameras has rapidly come into wide use, the method has been generally used as a method of outputting photographic images comparable to silver halide photographs.

In recent years, image quality has undergone improvement more than ever owing to, for example, extreme reduction in size of an ink droplet and an improvement of the color gamut involved in the introduction of multi-color inks. On the other hand, there have been additionally strict requests for not only the fastness properties of a formed image such as color development property, light resistance, and ozone resistance but also reliability such as ejection stability when the method is applied to a recording apparatus.

For example, an ink containing a phthalocyanine compound having a specific structure has been disclosed as an ink for providing an image excellent in fastness properties such as the ozone resistance (see Japanese Patent No. 2942319). An ink containing a monoazo compound having a specific structure has been also disclosed as an ink for providing an image having high chroma and high light resistance (see Japanese Patent Application Laid-Open No. 2002-504613).

However, with the advent of the recent miniaturization of an ink ejection portion in association with an improvement in quality of a recorded image, investigation has been conducted for additional improvements in reliability such as the ejection stability as well as in those properties mentioned above.

An ink for ink jet containing water as an aqueous medium, a water-insoluble coloring material, a resinous dispersant for dispersing the water-insoluble coloring material in the aqueous medium, glycerin, ethylene urea, and polyoxyethylene alkyl ether with an HLB of 13 or more has been disclosed as means for improving the ejection stability (see Japanese Patent Application Laid-Open No. 2003-138186). However, it is essential for the ink disclosed in the document to contain a pigment as a coloring material, and the document has no description concerning a use of a dye.

SUMMARY OF THE INVENTION

Therefore, an object of the present invention is to provide a liquid ink for ink jet which solves the above-mentioned problem in a conventional ink jet ink and which has extremely excellent ejection property, and an ink jet recording method using the ink.

That is, according to the present invention, there is provided a liquid ink for ink jet including: water; a coloring material; 1,5-pentanediol; and a humectant, in which the content of 1,5-pentanediol is 3 mass % or more and 15 mass % or less, and the total of the content of 1,5-pentanediol and the content of the humectant is 10 mass % or more and 40 mass % or less.

Further, according to the present invention, there is provided a liquid ink for ink jet including: water; a coloring material; 1,5-pentanediol; and a humectant, in which the liquid ink for ink jet gels or solidifies if it is left under an environment having a temperature of 25° C. and a humidity of 50% RH until substantially no change in weight occurs, and the liquid ink for ink jet remains in a liquid state after being left under an environment having a temperature of 30° C. and a humidity of 50% RH for 24 hours.

In addition, the present invention provides an ink jet recording method using the above-mentioned ink jet liquid ink.

According to the present invention, there are provided the liquid ink for ink jet having excellent ejection property and the ink jet recording method using the ink.

Further features of the present invention will become apparent from the following description of exemplary embodiments with reference to the attached drawings.

DESCRIPTION OF THE EMBODIMENTS

Hereinafter, the present invention will be described in more detail by way of a preferred embodiment. The inventors of the present invention have made extensive studies with a view to solving the above-mentioned problem of a conventional technique. As a result, the inventors have found properties of an ink suitably used in an ink jet recording apparatus of a type in which an ink temperature at the time of ink ejection is higher than an ink temperature before the issue of an ink ejection order, thereby achieving the present invention. That is, in the case of an ink having property with which the ink easily gels or solidifies under a temperature condition at any time except the time of ejection such as the time before the issue of the ink ejection order (that is, a temperature condition lower than a temperature at the time of ejection), the evaporation of an ink inside a nozzle can be suppressed at any time except the time of ejection. Meanwhile, an ink near an ejection opening can be liquefied under a temperature condition at the time of ejection (that is, a temperature condition higher than a temperature at any time except the time of ejection), so an ink-jet ink having excellent ejection stability can be provided. Examples of the ink jet recording apparatus of a type in which an ink temperature at the time of ink ejection is higher than an ink temperature before the issue of an ink ejection order include a apparatus having a temperature adjusting function to enable the temperature of an ink at the time of ejection to be adjusted, and a apparatus using thermal energy as energy for ejecting an ink.

In the invention described in Japanese Patent Application Laid-Open No. 2002-504613 described above, ejection stability is obtained by producing a coating film, which has such appropriate hardness that the film is broken by the force of an ink to be ejected, at the tip of a nozzle by using ethylene urea having an ability to form a coating film together with glycerin having a high moisture retaining ability. As described above, the technique disclosed in Japanese Patent Application Laid-Open No. 2002-504613 is completely different from the mechanism and technical idea of the invention of the present application in which an ink, which easily gels or solidifies at an ordinary temperature before ejection and which liquefies at a temperature at the time of the ejection of the ink, is used to eject the ink in a good state.

(Temperature Dependence of Ink)

As described above, in the present invention, an environment before the issue of an ink ejection order is assumed. The investigation conducted by the inventors of the present invention led to a realization that the specification of the state of an ink at a temperature of 25° C. and a humidity of 50% RH provides properties that coincide well with those of an ink obtained in an actual environment. To be specific, there is used an ink having property with which the ink gels or solidifies when left at a temperature of 25° C. and a humidity of 50% RH until substantially no change in weight occurs.

In addition, in the present invention, an ink temperature at the time of ink ejection is assumed. An ink temperature is typically 30° C. or higher (humidity of 50% RH) even in the ink jet recording apparatus having a temperature adjusting function described above or the ink jet recording apparatus of a thermal mode. The investigation conducted by the inventors of the present invention led to a realization that the specification of the state of an ink at a temperature of 30° C. and a humidity of 50% RH provides properties that coincide well with those of an ink obtained in the actual environment. To be specific, an ink which liquefies when left at a temperature of 30° C. and a humidity of 50% RH is used.

The phrase "until substantially no change in weight occurs" used in the present invention refers to a state where a volatile component in an ink evaporates so that nearly no change in weight occurs. To be more specific, the phrase refers to a point at which a change in weight of an ink per hour becomes about 1 mass % or less; provided, however, that the period for which the ink is left does not exceed 10 days. In addition, the term "gels" refers to a state where an ink loses its fluidity and becomes a jelly, and the term "solidifies" refers to a state where the ink that has gelled additionally hardens. The fact that "an ink gels or solidifies when it is left until substantially no change in weight occurs" and the fact that "an ink liquefies when it is left under an environment having a temperature of 30° C. and a humidity of 50% RH for 24 hours" can be verified by the following method.

First, an ink to be verified is extracted from an ink cartridge. Next, 10 g of the ink are charged into a dish having a diameter of about 4 to 5 cm and are left under an environment at 25° C. and 50% RH. Then, whether or not the ink undergoes one of gelation and solidification when a change in weight becomes 1 mass % or less is confirmed through visual observation or the like. In addition, a temperature sensor is attached near an ejection portion of a head of an ink jet printer on which the ink is to be mounted to monitor a temperature at the time of ejection. Since a temperature near the ejection portion of the head may be approximated to the temperature of the ink around the ejection portion, the ink that has gelled or solidified is left under the monitored temperature environment, to thereby confirm whether the ink liquefies. In addition, even when it is difficult to monitor a temperature at the time of ejection, the ink is left under an environment at 30° C. and 50% RH, and whether the ink liquefies is confirmed through visual observation or the like.

Hereinafter, materials in an ink of the present invention will be described. The ink of the present invention contains at least water, a coloring material, 1,5-pentanediol, and a humectant.

(1,5-pentanediol and humectant)

The use of 1,5-pentanediol and a humectant may be exemplified as an example of important means for providing an ink showing the properties as described above. The ability of 1,5-pentanediol to dissolve a coloring material (i.e., solubility) is low under a temperature environment having a temperature of 25° C. or lower and a humidity of 50% RH or lower. Therefore, when an ink containing 1,5-pentanediol and a coloring material is used as an ink-jet ink, an ink near an ejection opening easily gels or solidifies. As a result, the evaporation of a volatile component in an ink inside an ejection portion is suppressed.

On the other hand, the solubility of a coloring material in a mixed solvent of 1,5-pentanediol and a humectant is extremely high under a temperature environment having a temperature of 30° C. or higher and a humidity of 50% RH or higher. Accordingly, when an ink containing 1,5-pentanediol, a humectant, and a coloring material is used as an ink jet ink, an ink near an ejection opening is sufficiently liquefied. As a result, the ink mixes with an ink inside an ejection portion owing to diffusion, and the mixed ink shows ejection performance comparable to that of an ink in an initial state.

In the present invention, the content of 1,5-pentanediol is 3 mass % or more and 15 mass % or less with respect to the total mass of the ink. When the content is less than 3 mass %, a significant effect of the invention of the present application cannot be obtained. When the content exceeds 15 mass %, the viscosity of the ink becomes too high that ejection property deteriorates. In the present invention, the content is preferably 4 mass % or more. In addition, the content is preferably 10 mass % or less, or more preferably 7.5 mass % or less.

An example of a preferable humectant used in the present invention is a compound selected from the group consisting of ethylene glycol, diethylene glycol, polyethylene glycol, glycerin, 2-pyrrolidone, ethylene urea, and urea, in terms of a synergistic effect exerted through combined use with 1,5-pentanediol described above. Of those, ethylene glycol, glycerin, 2-pyrrolidone, and ethylene urea are particularly preferable.

In the present invention, the total of the content of 1,5-pentanediol and the content of the humectant is 10 mass % or more and 40 mass % or less with respect to the total mass of the ink. When the total of the contents is less than 10 mass %, a significant effect of the invention of the present application cannot be obtained. When the total of the contents exceeds 40 mass %, the viscosity of the ink becomes too high that ejection property deteriorates.

Further, in the present invention, the content of 1,5-pentanediol is preferably 13 mass % or more and 50 mass % or less with respect to the total of the content of 1,5-pentanediol and the content of the humectant.

(Coloring Material)

Any coloring material can be used in the ink of the present invention as long as the coloring material can realize the above-mentioned physical properties of the ink. Examples of a preferable coloring material for achieving such physical properties include compounds represented by the following formulae (1) to (4). In the present invention, the content of the coloring material is preferably 1 mass % or more and 10 mass % or less, or particularly preferably 1 mass % or more and 6 mass % or less with respect to the total mass of the ink.

Formula (1)

where M represents an alkali metal or ammonium, l=0 to 2, m=1 to 3, and n=1 to 3, provided that l+m+n=3 to 4, and the substitution position of a substituent is 4- or 4'-position.

Formula (2)

where M represents an alkali metal or ammonium, x and y each independently represent any one of 1, 2, 3, and 4, and x+y=2 to 5.

Formula (3)

where M represents an alkali metal or ammonium.

Formula (4)

where M represents an alkali metal or ammonium.

Compounds represented by the above-mentioned formulae (1) and (2) are each a coloring material with a phthalocyanine skeleton having a cyan hue and high ozone resistance. In general, a coloring material with a phthalocyanine skeleton has higher aggregability than that of a coloring material having any other structure (such as triphenylmethane, azo, or xanthene), and improving the aggregability improves the fastness properties of an image. In addition, a compound represented by the above-mentioned formula (3) is an anthrapyridone coloring material having a magenta hue and high light resistance. In addition, a compound represented by the above-mentioned formula (4) is a monoazo coloring material having a yellow hue, high color development property, and high light resistance.

In the present invention, compounds each represented by the above-mentioned formula (1) or (3) are particularly preferable. Such compounds each have not only extremely excellent fastness property but also a relatively large molecule. Accordingly, the solubility of the coloring material in a solvent under a temperature environment having a temperature of 25° C. and a humidity of 50% RH is reduced by the above-mentioned synergistic effect with an effect of 1,5-pentanediol. As a result, an ink containing any one of those compounds easily gels or solidifies under such the environment.

(Method of Verifying Coloring Material)

The following method can be employed in verifying whether any one of the compounds represented by the above-mentioned formulae (1) and (2) is incorporated into an ink. That is, high performance liquid chromatography (HPLC) is used as analyzing means to determine measured values for the following three points. As a result, whether an ink contains a target coloring material can be verified.

[1] The retention time of a peak by HPLC

[2] The maximum absorption wavelength in the peak of the above-mentioned item [1]

[3] M/Z (posi) of a mass spectrum in the peak of the above-mentioned item [1]

Analysis conditions for high performance liquid chromatography are as shown below. An ink solution prepared by diluting an ink with pure water by about 50-fold is analyzed by means of high performance liquid chromatography under the following conditions so that the retention time of a peak and the maximum absorption wavelength of the peak are measured.

Column: Symmetry C18 2.1 mm×150 mm
Gradient conditions of respective mobile phases

|   |                                         | Mobile phase      |          |
|---|-----------------------------------------|-------------------|----------|
|   |                                         | 0-15 min          | 15-30 min |
| A: | Water                                  | 87.5% → 0%        | 0%       |
| B: | Acetonitrile                           | 10% → 97.5%       | 97.5%    |
| C: | 200-mmol/l aqueous solution of ammonium acetate | 2.5%  | 2.5%     |

Flow rate: 0.2 ml/min
Column temperature: 40° C.
Measurement wavelength region: 210 nm to 700 nm
In addition, analysis conditions for a mass spectrum are as shown below. The mass spectrum of a peak obtained as a result of HPLC is measured under the following conditions, whereby M/Z (posi) is obtained.
Ionization method
ESI
Capillary voltage: 3.1 kV
Desolvating gas: 300° C.
Ion source temperature: 120° C.
Detector
posi: 40 V 500-2,000 amu/0.9 sec The analysis of a standard ink for verification containing any one of the compounds represented by the above-mentioned formulae (1) and (2) by the above-mentioned analysis method has revealed the following. That is, in the case of an ink containing a compound represented by the formula (1) or (2), the peak ratio of a mass spectrum obtained from a peak of HPLC varies depending on the kind and position of a substituent and on the mixing ratio of isomers different from each other in number, but the M/Z peak shown below is always detected.

Therefore, the analysis method is an effective method of verifying whether a compound represented by the formula (1) or (2) is incorporated into an ink. When the respective values for the above-mentioned items [1] to [3] obtained by the above-mentioned verification method each fall within the following ranges, an ink can be said to contain a compound represented by the formula (1) or (2).

Results of analysis when ink contains compound represented by formula (1)

| [1] Retention time (min) | [2] Maximum absorption wavelength (nm) | M/Z Posi |
|---|---|---|
| 6.9-7.2 | 600-620 | 1,670-1,672 |

Results of analysis when ink contains compound represented by formula (2)

| [1] Retention time (min) | [2] Maximum absorption wavelength (nm) | M/Z Posi |
|---|---|---|
| 19.2-19.5 | 658-678 | 815-818 |

In the case where it is verified whether a compound represented by the above-mentioned formula (3) is incorporated into an ink, [1] the retention time of a peak by high performance liquid chromatography, [2] the maximum absorption wavelength of the peak, and [3] M/Z (posi, nega) in the mass spectrum of the peak are used.

Analysis conditions for high performance liquid chromatography are as shown below. An ink solution prepared by diluting an ink with pure water by about 1,000-fold is analyzed by means of high performance liquid chromatography under the following conditions so that the retention time of a peak and the maximum absorption wavelength of the peak are measured.

Column: Symmetry C18 2.1 mm×150 mm
Gradient conditions of respective mobile phases

|   |                                      | 0-5 min | 5-40 min   | 40-45 min |
|---|--------------------------------------|---------|------------|-----------|
| A: | Water                               | 85%     | 85% → 0%   | 0%        |
| B: | Methanol                            | 10%     | 10% → 95%  | 95%       |
| C: | 0.2-mol/l aqueous solution of ammonium acetate | 5% | 5% | 5%        |

Flow rate: 0.2 ml/min
Column temperature: 40° C.
Measurement wavelength region: 210 nm to 700 nm
In addition, analysis conditions for a mass spectrum are as shown below. The mass spectrum of a peak obtained as a result of HPLC is measured under the following conditions. M/Z most strongly detected is measured for each of posi and nega.
Ionization method
ESI
Capillary voltage: 3.5 kV
Desolvating gas: 300° C.
Ion source temperature: 120° C.
Detector
posi: 40 V 200-1,500 amu/0.9 sec
nega: 40 V 200-1,500 amu/0.9 sec The resultant values for [1] the retention time of a peak of high performance liquid chromatography, [2] the maximum absorption wavelength of the peak by PDA, and [3] M/Z (posi) and M/Z (nega) in the mass spectrum of the peak are shown below. As in the case of a compound represented by the formula (1), in the case where an ink contains a compound represented by the formula (3), those results of detection were always obtained. Therefore, when the respective values for the above-mentioned items [1] to [3] obtained by the above-mentioned verification method each fall within the following ranges, an ink can be said to contain a compound represented by the formula (3).

Results of analysis when ink contains compound represented by formula (3)

| [1] Retention time (min) | [2] Maximum absorption wavelength (nm) | M/Z Posi | M/Z Nega |
|---|---|---|---|
| 21-23 | 530-550 | 941-944 | 469-471 |

In the case where it is verified whether a compound represented by the above-mentioned formula (4) is incorporated into an ink, [1] the retention time of a peak by high performance liquid chromatography, [2] the maximum absorption wavelength of the peak, and [3] M/Z (posi, nega) in the mass spectrum of the peak are used.

Analysis conditions for high performance liquid chromatography are as shown below. An ink solution prepared by diluting an ink with pure water by about 1,000-fold is analyzed by means of high performance liquid chromatography under the following conditions so that the retention time of a peak and the maximum absorption wavelength of the peak are measured.

Column: Symmetry C18 2.1 mm×150 mm

Gradient conditions of mobile phases

|   |   |   | 0-5 min | 5-40 min | 40-45 min |
|---|---|---|---|---|---|
| A: | Water |  | 85% | 85% → 0% | 0% |
| B: | Methanol |  | 10% | 10% → 95% | 95% |
| C: | 0.2-mol/l aqueous solution of ammonium acetate |  | 5% | 5% | 5% |

Flow rate: 0.2 ml/min

Column temperature: 40° C.

PDA: 210 nm to 700 nm

In addition, analysis conditions for a mass spectrum are as shown below. The mass spectrum of a peak obtained as a result of HPLC is measured under the following conditions. M/Z most strongly detected is measured for each of posi and nega.

Ionization method

ESI

Capillary voltage: 3.5 kV

Desolvating gas: 300° C.

Ion source temperature: 120° C.

Detector posi: 40 V 200-1,500 amu/0.9 sec nega: 40 V 200-1,500 amu/0.9 sec

The resultant values for [1] the retention time of a peak of high performance liquid chromatography, [2] the maximum absorption wavelength of the peak by PDA, and [3] M/Z (posi) and M/Z (nega) in the mass spectrum of the peak are shown below. As in the case of a compound represented by the formula (1), in the case where an ink contains a compound represented by the formula (4), those results of detection were always obtained. Therefore, when the respective values for the above-mentioned items [1] to [3] obtained by the above-mentioned verification method each fall within the following ranges, an ink can be said to contain a compound represented by the formula (4).

The resultant values for [1] the retention time of a peak of high performance liquid chromatography, [2] the maximum absorption wavelength of the peak by PDA, and [3] M/Z (posi) and M/Z (nega) in the mass spectrum of the peak are shown below. As in the case of a compound represented by the formula (1), in the case where an ink contains a compound represented by the formula (3), those results of detection were always obtained. Therefore, when the respective values for the above-mentioned items [1] to [3] obtained by the above-mentioned verification method each fall within the following ranges, an ink can be said to contain a compound represented by the formula (3).

Results of analysis when ink contains compound represented by formula (4)

| [1] Retention time | [2] Maximum absorption wavelength | M/Z | |
|---|---|---|---|
| (min) | (nm) | Posi | Nega |
| 1.7-1.8 | 420-440 | 473-477 | 169-173 |

(Aqueous Medium)

The ink according to the present invention contains water, 1,5-pentanediol, and a humectant as aqueous media. Further, the ink according to the present invention may be appropriately added with, for example, a water-soluble organic solvent or a water-soluble additive as an aqueous medium as required in order that other ink jet properties and the like may be imparted to the ink.

Preferable examples of the water-soluble organic solvent include: alkanol having 1 to 4 carbon atoms such as ethanol, isopropanol, n-butanol, isobutanol, secondary butanol, and tertiary butanol; carboxylic amide such as N,N-dimethylformamide and N,N-dimethylacetamide; ketone such as acetone, methylethylketone, and 2-methyl-2-hydoxypentane-4-one; or cyclic ether such as keto-alcohol, tetrahydrofuran, and dioxane; polyhydric alcohols such as triethylene glycol, tetraethylene glycol, 1,2 or 1,3-propylene glycol, 1,2 or 1,4-butylene glycol, 1,3-butanediol, 1,2-hexanediol, 1,6-hexanediol, dithioglycol, 2-methyl-1,3-propanediol, 1,2,6,-hexanetriol, an acetylene glycol derivative, and trimethylolpropane; alkyl ethers of polyhydric alcohol such as ethylene glycol monomethyl (or monoethyl) ether, diethylene glycol monomethyl (or monoethyl) ether, and triethylene glycol monoethyl (or monobutyl) ether; heterocycles such as N-methyl-2-pyrolidone, 1,3-dimethyl-2-imidazolidinone, and N-methylmorpholine; and sulfur-containing compounds such as dimethylsulfoxide.

In addition, any of various additives such as a surfactant, a pH adjuster, a chelating agent, a rust inhibitor, an antiseptic, an antifungal agent, a UV absorber, a viscosity modifier, a defoaming agent, and a water-soluble polymer may be incorporated as a water-soluble additive.

Any of an anionic surfactant, an ampholytic surfactant, a cationic surfactant, a nonionic surfactant, and the like can be used as the surfactant as required. To be more specific, any of the surfactants listed below can be used.

Examples of the anionic surfactant include alkylsulfocarboxylate, α-olefin sulfonate, polyoxyethylene alkylether acetate, N-acylamino acid and salts thereof, N-acylmethyl taurine salts, alkylsulfate polyoxyalkylether sulfate, alkylsulfate polyoxyethylene alkylether phosphate, rosin acid soap, sulfate ester of castor oil, lauryl alcohol sulfate ester, alkylphenol-type phosphate ester, alkyl-type phosphate ester, alkylarylsulfonate, diethylsulfosuccinate, diethylhexylsulfosuccinate, and dioctylsulfosuccinate.

Examples of the cationic surfactant include 2-vinylpyridine derivatives and poly-4-vinylpyridine derivatives. Examples of the ampholytic surfactant include lauryldimethyl aminoacetate betaine, 2-alkyl-N-carboxymethyl-N-hydroxyethyl imidazolinium betaine, coconut oil fatty acid amidopropyldimethyl aminoacetate betaine, polyoctylpolyaminoethylglycine, and other imidazolin derivatives.

Examples of the nonionic surfactant include: ether-type compounds such as polyoxyethylene nonylphenylether, polyoxyethylene octylphenylether, polyoxyethylene dodecylphenylether, polyoxyethylene laurylether, polyoxyethylene oleylether, polyoxyethylene alkylether, and polyoxyallylalkylether; ester-type compounds such as polyoxyethylene oleic acid, polyoxyethylene oleate ester, polyoxyethylene distearate ester, sorbitan laurate, sorbitan monostearate, sorbitan monooleate, sorbitan sesquiolate, polyoxyethylene monooleate, and polyoxyethylene stearate; acetylene glycol-type compounds such as 2,4,7,9,-tetramethyl-5-decyne-4,7-diol, 3,6-dimethyl-4-octyne-3,6-diol, and 3,5-dimethyl-1-hexyne-3-ol (e.g., Acetylenol EH (trade name) manufactured by Kawaken Fine Chemicals Co., Ltd., Surfynol 104, 82, 465, and olfine STG (trade names: manufactured by Nissin Chemical Industry Co., Ltd.)).

An arbitrary material capable of regulating pH of an ink within the range of 6.0 to 11.0 can be used as a pH adjuster. Examples of the pH adjuster include: alcohol amine compounds such as diethanolamine, triethanolamine, isopropanolamine, and trishydroxymethylaminomethane; hydroxides of an alkali metal such as lithium hydroxide and potassium hydroxide; and carbonates of an alkali metal such as ammonium hydroxide or lithium carbonate, sodium carbonate, and potassium carbonate. Of those, the alcohol amine compounds such as diethanolamine, triethanolamine, isopropanolamine, and trishydroxymethylaminomethane, or the carbonates of an alkali metal such as lithium carbonate, sodium carbonate, and potassium carbonate each have a suppressing effect on generation of bronze phenomena, and are preferably used as a pH adjuster.

Examples of the antiseptic or antifungal agent include an organic sulfur-based compound, an organic nitrogen sulfur-based compound, an organic halogen-based compound, a haloallylsulfone-based compound, an iodopropagyl-based compound, an N-haloalkylthio-based compound, a benzothiazole-based compound, a nitoryl-based compound, a pyridine-based compound, an 8-oxyquinoline-based compound, a benzothiazole-based compound, an isothiazoline-based compound, a dithiol-based compound, a pyridineoxide-based compound, nitropropane-based compound, an organotin-based compound, a phenol-based compound, a quarternary ammonium salt-based compound, a triazine-based compound, a thiadiazine-based compound, an anilide-based compound, an adamantane-based compound, a dithiocarbamate-based compound, a bromonated indanone-based compound, a benzylbrom acetate-based compound, and an inorganic salt-based compound.

An example of the organic halogen-based compound described above includes sodium pentachlorophenol. An example of the pyridineoxide-based compound described above includes 2-pyridinethiol-1-sodium oxide. An example of the inorganic salt-based compound includes sodium acetic anhydride. Examples of the isothiazoline compound described above include 1,2-benzisothiazoline-3-one, 2-n-octyl-4-isothiazoline-3-one, 5-chloro-2-methyl-4-isothiazoline-3-one, 5-chloro-2-methyl-4-isothiazoline-3-one magnesium chloride, and 5-chloro-2-methyl-4-isothiazoline-3-one calcium chloride. Examples of the other antiseptic or antifungal agent include sodium sorbate and sodium bezonate such as Proxel GXL (S) and Proxel XL-2 (S) (both manufactured by Avecia Co., Ltd.).

Examples of the chelating agent include sodium citrate, sodium ethylenediaminetetraacetate, sodium dinitrotriacetate, sodium hydroxyethylethylenediamine-triacetate, sodium diethylenetriaminepentaacetate, and sodium uramil diacetate.

Examples of the rust inhibitor include acidic sulfite, sodium thiosulfate, ammonium thioglycolate, diisopropylammonium nitrite, tetranitratepentaerythritol, and dicyclohexylammonium nitrite.

A compound that absorbs ultraviolet light to emit fluorescence, that is, a so-called fluorescent bleach, typified by, for example, a benzophenone-based compound, a benzotriazole-based compound, a cinnamic acid-based compound, a triazine-based compound, a stilbene-based compound, or a benzoxazole-based compound can also be used as the UV absorber.

Examples of the viscosity modifier include water-soluble polymer compounds in addition to water-soluble organic solvents. For example, polyvinyl alcohol, a cellulose derivative, polyamine, or polyimine can be used as required.

A fluorine-based or silicone-based compound, for example, is used as the defoaming agent as required.

(Ink Jet Recording Method)

A cyan ink according to the present invention can be used in an ink jet recording method involving ejecting an ink from an ink jet head in accordance with a recording signal to apply the ink onto a recording medium. The ink can be particularly preferably used in an ink jet recording method in which energy for ejecting an ink is thermal energy.

(Ink Cartridge)

A preferred specific example of an ink cartridge suitable for conducting ink jet recording by using a cyan ink of the present invention is described.

Figure 1:
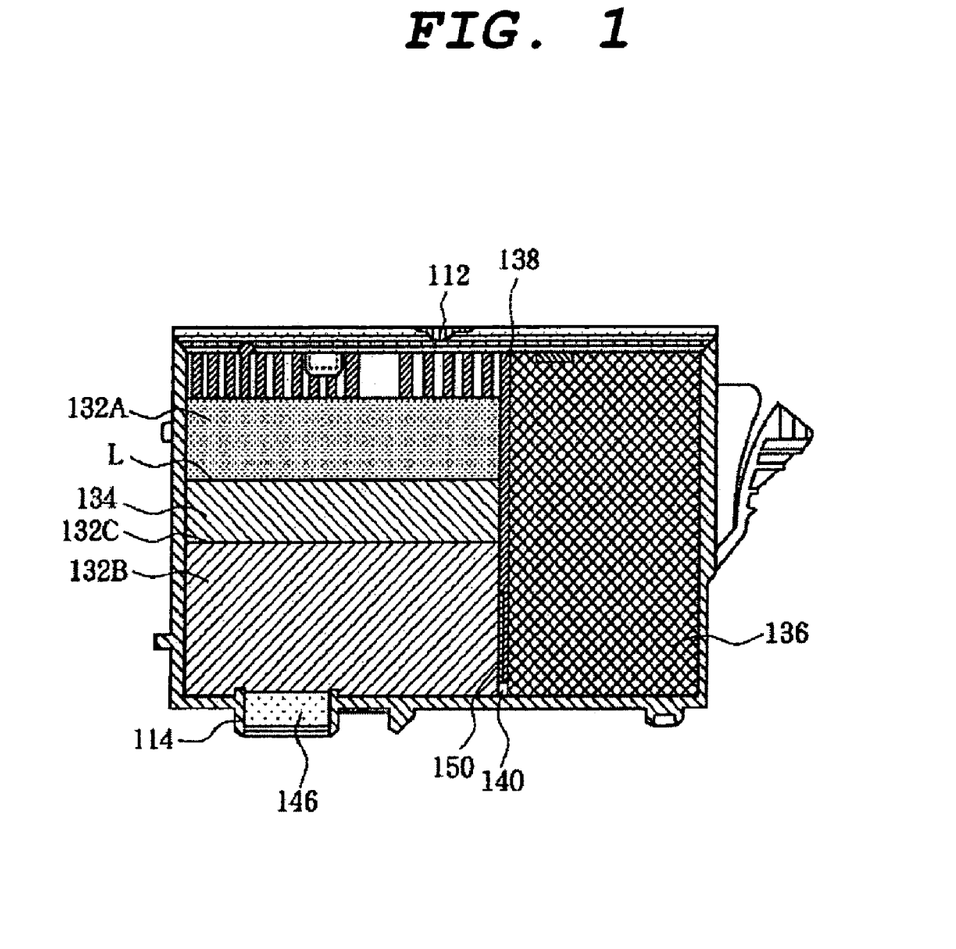
FIG. 1 is a schematic explanatory view of a liquid storage container serving as an ink cartridge suitable for performing recording by using an ink of the present invention.

FIG. 1 is a schematic explanatory and cross-sectional view of a liquid-storing container serving as an ink cartridge suitable for use in conducting ink jet recording by using a cyan ink of the present invention. In FIG. 1, the liquid-storing container (ink tank) has a structure such that it is in communication with the atmosphere at an upper section via an air vent 112 and is in communication with an ink supply port 114 at a lower section. Further, the liquid-storing container (ink tank) is partitioned by a partitioning wall 138 into a negative pressure generation member holding chamber 134, which holds a negative pressure generation member, and a liquid-storing chamber 136, which is substantially sealed and stores the liquid ink. The negative pressure generation member holding chamber 134 and the liquid-storing chamber 136 are in communication with each other only through a communication hole 140 formed in the partitioning wall 138 near a bottom section of the liquid-storing container (ink tank), and an air lead-in groove (air lead-in path) 150 for accelerating the introduction of air into the liquid-storing chamber during liquid supply operation. A plurality of ribs are formed in an integrated manner on an upper wall of the liquid-storing container (ink tank) which forms the negative pressure generation member holding chamber 134 so as to project into the inside, wherein the ribs are brought into contact with the negative pressure generation member, which is held in a compressed state, in the negative pressure generation member holding chamber 134. These ribs form an air buffer chamber between the upper wall and an upper surface of the negative pressure generation member.

Further, a pressure contact member 146 having greater capillary force and physical strength than the negative pressure generation member, is stored in an ink supply pipe provided with the ink supply port 114, whereby the ink supply pipe is brought into pressure contact with the negative pressure generation member. Two capillary force generation type negative pressure generation members, composed of a first negative pressure generation member 132B and a second negative pressure generation member 132A made from an olefin resin fiber such as polyethylene, are held as the negative pressure generation members in the negative pressure generation member holding chamber of the present embodiment. The member 132C is a boundary layer between these two negative pressure generation members, wherein the intersection of the boundary layer 132C with the partitioning wall 138 exists above the upper edge of the air lead-in groove (air lead-in path) 150 in the configuration in which the liquid-storing container is being used with its communication part positioned downward. Further, the ink held in the negative pressure generation members is present up to a level higher than the above-described boundary layer 132C, as indicated by the liquid surface L of the ink.

Here, the first negative pressure generation member is brought into pressure contact with the boundary layer of the second negative pressure generation member, so that the compression ratio in the vicinity of the boundary layer of the negative pressure generation members is higher than that in the other sections, whereby strong capillary force is generated. That is, when the capillary force of the first negative pressure generation member is represented by P1, the capillary force of the second negative pressure generation member by P2 and the capillary force possessed by the interface between the negative pressure generation members by PS, the relationship P2<P1<PS is satisfied.

Figure 2:
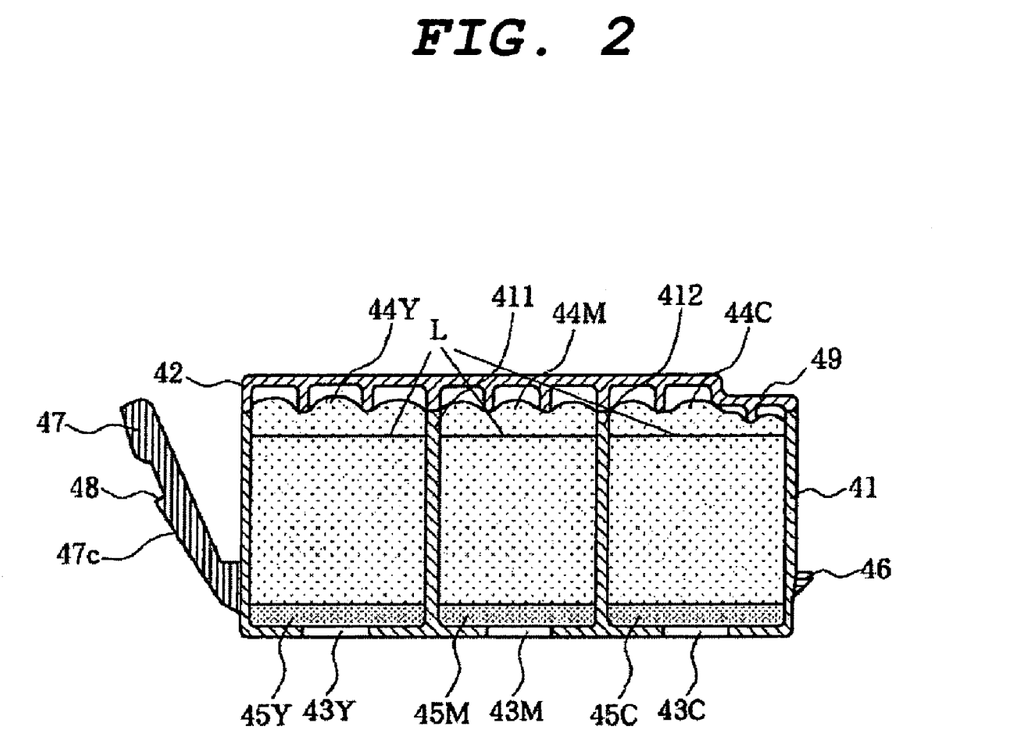
FIG. 2 is a schematic explanatory view of a liquid storage container serving as an ink cartridge suitable for performing recording by using the ink of the present invention.

FIG. 2 is a schematic explanatory and cross-sectional view of a liquid-storing container which is another ink cartridge suitable for conducting recording by using an ink of the present invention. The ink cartridge has a container 41 for storing three colors of inks (yellow (Y), magenta (M) and cyan (C)), and a cap member 42 which covers the container 41. The interior of the container 41 is partitioned into three spaces which have an approximately equal capacity by two partitioning plates 411 and 412 disposed parallel to each other for storing the three ink colors. These three spaces are aligned in a direction into which the color ink tank is inserted when mounting the color ink tank onto an ink tank holder. These three spaces hold respectively an ink absorbing body 44Y for absorbing and retaining a yellow ink, an ink absorbing body 44M for absorbing and retaining a magenta ink, and an ink absorbing body 44C for absorbing and retaining a cyan ink. The inks held in these absorbing bodies 44Y, 44M and 44C, which act as negative pressure generation members, are present up to a level higher than the upper sections of the respective absorbing bodies, as indicated by the liquid surface L of the ink. This ink cartridge may be further provided with an ink jet recording head having ejection ports for Y, M and C, respectively.

EXAMPLES

Synthesis of Coloring Material (Coloring Material for Cyan Ink)

Sulfolane, monosodium 4-sulfophthalate, ammonium chloride, urea, ammonium molybdate, and copper (II) chloride were mixed, stirred, and washed with methanol. Thereafter, water was added to the resultant product, and an aqueous solution of sodium hydroxide was used to adjust the pH of the solution to 11. An aqueous solution of hydrochloric acid was added to the resultant solution under stirring, and then sodium chloride was gradually added to precipitate crystals. The resultant precipitated crystals were filtered and washed with a 20% aqueous solution of sodium chloride, and then methanol was added. The separated out crystals were filtered out, washed with a 70% aqueous solution of methanol, and dried to yield tetrasodium copper phthalocyanine tetrasulfonate as blue crystals.

Next, the present invention will be described more specifically by way of preferable examples. It should be noted that the present invention is not limited to the following examples. The terms "part(s)" and "%" in the following description represent "part(s) by mass" and "mass %", respectively, unless otherwise stated.

Compound of Formula (1-1)

[(1) Synthesis of copper phthalocyanine tetrasulfonic acid tetrasodium salt (compound represented by the following formula (A))]

Formula (A)

[(2) Synthesis of copper phthalocyanine tetrasulfonic acid chloride (compound represented by the following formula (B))]

Formula (B)

Next, the above-obtained tetrasodium copper phthalocyanine tetrasulfonate was gradually added to chlorosulfonic acid, and then thionyl chloride was added dropwise to perform a reaction. The reaction liquid was cooled and the precipitated crystal was filtered, whereby the wet cake of copper phthalocyanine tetrasulfonic acid chloride represented by the above-mentioned formula (B) was obtained.

[(3) Synthesis of compound represented by the following formula (C)]

Formula (C)

A compound represented by the above formula (α) was synthesized in the following manner. Lipal OH, cyanuric chloride, and monosodium aniline-2,5-disulfonate were added to ice water, and an aqueous solution of sodium hydroxide was added. Next, an aqueous solution of sodium hydroxide was added to the reaction solution to adjust the pH of the reaction solution to 10.0. To the reaction solution, 28% ammonia water and ethylenediamine were added to perform a reaction. Sodium chloride and concentrated hydrochloric acid were added dropwise to the resultant reaction solution to precipitate crystals. The precipitated crystals were filtered out and fractionated, and was washed with a 20% aqueous solution of sodium chloride to prepare a wet cake. The resultant wet cake was added with methanol and water, and the whole was filtered. The filtrate was washed with methanol and then dried, whereby a desired compound represented by the above-mentioned formula (C) was obtained.

[(4) Synthesis of compound represented by the following formula (1-1)]

The wet cake of copper phthalocyanine tetrasulfonic acid chloride represented by the above-mentioned formula (B) obtained by the method described in the above-mentioned section (2) was suspended into ice water while being stirred. Next, ammonia water and the compound represented by the above-mentioned formula (A) obtained by the method described in the above-mentioned section (1) were added to the suspension, and then water and sodium chloride were added to the mixture. The precipitated crystal was filtered and washed with an aqueous solution of sodium chloride. The crystal was filtered and washed again, and was then dried, thereby resulting in a phthalocyanine compound represented by the following formula (1-1) as a blue crystal.

wherein l represents 0 to 2, m represents 1 to 3, and n represents 1 to 3 (provided that l+m+n=3 to 4 and m≧1); positions at which the substituents are present are the 4- or 4'- position; and M represents sodium.

Compound of Formula (2-1)

Commercially available C.I. Direct Blue 199 was prepared. The compound is represented by the following formula.

C. I. Direct Blue 199

Synthesis of Compound Represented by Formula (3-1)

The compound represented by the following formula (γ), sodium carbonate, and ethyl benzoyl acetate were allowed to react with one another in xylene, and the reactant was filtered and washed. To the resultant, were sequentially added m-amino acetanilide, copper acetate, and sodium carbonate in N,N-dimethylformamide to carry out a reaction, and the reactant was filtered and washed. The resultant was sulfonated in fuming sulfuric acid, and the resultant was filtered and washed. The resultant was subjected to a condensation reaction with cyanuric chloride in the presence of sodium hydroxide.

The resultant was filtered and washed. The resultant was filtered and washed again, and was then dried, thereby resulting in the red crystal of a compound represented by a formula (3-1).

Formula (1-1)

Synthesis of Compound Represented by Formula (4-1)

A compound represented by the following formula (4-1) was synthesized with reference to examples given in Japanese Patent Application Laid-Open No. 2002-504613.

Formula (4-1)

(Preparation of Ink)

Inks were prepared according to such formulation as shown in each of Tables 1 to 8 below, and were each filtered through a membrane filter having a pore size of 0.2 μm under pressure, whereby inks of Examples 1 to 10 and Comparative Examples 1 to 16 were obtained. Unless otherwise stated, the content of an ink component in each of examples and comparative examples is represented in a unit of "mass %".

It should be noted that the term "state after leaving at 25° C. and 50% RH" indicated by *1 in each table refers to the following state: the state of an ink visually observed when a change in weight per hour becomes 1% or less upon leaving 10 g of the ink, which have been charged into a dish container having an inner diameter of 4.5 cm and a height of 2 cm, under an environment at 25° C. and 50% RH for a maximum of 10 days. In addition, the term "state after leaving at 30° C. and 50% RH" indicated by *2 in each table refers to the following state: the state of an ink, which has already undergone the state of *1 described above, visually observed after the ink is left under an environment at 30° C. and 50% RH for 24 hours.

TABLE 1

Composition and properties of ink of each of Examples 1 and 2 (unit: %)

|  | Example 1 | Example 2 |
|---|---|---|
| Compound of the formula (1-1) | 5.5 | 5.5 |
| 1,5-pentanediol | 6.0 | 7.5 |
| Glycerin | 5.0 | 5.0 |
| Ethylene glycol | 7.0 | 5.0 |
| Acetylenol E100 | 0.5 | 0.5 |
| Water | 76.0 | 76.5 |
| State after leaving at 25° C. and 50% RH (*1) | Solid | Solid |
| State after leaving at 30° C. and 50% RH (*2) | Liquid | Liquid |

TABLE 2

Composition and properties of ink of each of Comparative Examples 1 to 4 (unit: %)

|  | Comparative Example 1 | Comparative Example 2 | Comparative Example 3 | Comparative Example 4 |
|---|---|---|---|---|
| Compound of the formula (1-1) | 5.5 | 5.5 | 5.5 | 5.5 |
| 1,5-pentanediol | 2.0 | 20 | — | — |
| Glycerin | 8.0 | — | 20 | — |
| Ethylene glycol | 7.0 | — | — | 20 |
| Acetylenol E100 | 0.5 | 0.5 | 0.5 | 0.5 |
| Water | 77.0 | 74.0 | 74.0 | 74.0 |
| State after leaving at 25° C. and 50% RH (*1) | Liquid | Solid | Liquid | Liquid |
| State after leaving at 30° C. and 50% RH (*2) | Liquid | Solid | Liquid | Liquid |

TABLE 3

Composition and properties of ink of each of Examples 3 and 4 (unit: %)

|  | Example 3 | Example 4 |
|---|---|---|
| Compound of the formula (2-1) | 5.5 | 5.5 |
| 1,5-pentanediol | 6.0 | 7.5 |
| Glycerin | 5.0 | 5.0 |
| Ethylene glycol | 7.0 | 5.0 |
| Acetylenol E100 | 0.5 | 0.5 |
| Water | 76.0 | 76.5 |
| State after leaving at 25° C. and 50% RH (*1) | Solid | Solid |
| State after leaving at 30° C. and 50% RH (*2) | Liquid | Liquid |

TABLE 4

Composition and properties of ink of each of Comparative Examples 5 to 8 (unit: %)

|  | Comparative Example 5 | Comparative Example 6 | Comparative Example 7 | Comparative Example 8 |
|---|---|---|---|---|
| Compound of the formula (2-1) | 5.5 | 5.5 | 5.5 | 5.5 |
| 1,5-pentanediol | 2.0 | 20 | — | — |
| Glycerin | 8.0 | — | 20 | — |
| Ethylene glycol | 7.0 | — | — | 20 |
| Acetylenol E100 | 0.5 | 0.5 | 0.5 | 0.5 |
| Water | 77.0 | 74.0 | 74.0 | 74.0 |

TABLE 4-continued

Composition and properties of ink of each of Comparative Examples 5 to 8 (unit: %)

|  | Comparative Example 5 | Comparative Example 6 | Comparative Example 7 | Comparative Example 8 |
| --- | --- | --- | --- | --- |
| State after leaving at 25° C. and 50% RH (*1) | Liquid | Solid | Liquid | Liquid |
| State after leaving at 30° C. and 50% RH (*2) | Liquid | Solid | Liquid | Liquid |

TABLE 5

Composition and properties of ink of each of Examples 5 to 8 (unit: %)

|  | Example 5 | Example 6 | Example 7 | Example 8 |
| --- | --- | --- | --- | --- |
| Compound of the formula (3-1) | 5.5 | 5.5 | 5.5 | 5.5 |
| 1,5-pentanediol | 3.0 | 4.5 | 6.0 | 7.5 |
| Glycerin | 7.0 | 5.0 | 5.0 | 5.0 |
| Ethylene glycol | 7.0 | 7.0 | 7.0 | 5.0 |
| Acetylenol E100 | 0.5 | 0.5 | 0.5 | 0.5 |
| Water | 77.0 | 77.5 | 76.0 | 76.5 |
| State after leaving at 25° C. and 50% RH (*1) | Gel | Solid | Solid | Solid |
| State after leaving at 30° C. and 50% RH (*2) | Liquid | Liquid | Liquid | Liquid |

TABLE 6

Composition and properties of ink of each of Comparative Examples 9 to 12 (unit: %)

|  | Comparative Example 9 | Comparative Example 10 | Comparative Example 11 | Comparative Example 12 |
| --- | --- | --- | --- | --- |
| Compound of the formula (3-1) | 5.5 | 5.5 | 5.5 | 5.5 |
| 1,5-pentanediol | 2.0 | 20 | — | — |
| Glycerin | 8.0 | — | 20 | — |
| Ethylene glycol | 7.0 | — | — | 20 |
| Acetylenol E100 | 0.5 | 0.5 | 0.5 | 0.5 |
| Water | 77.0 | 74.0 | 74.0 | 74.0 |
| State after leaving at 25° C. and 50% RH (*1) | Liquid | Solid | Liquid | Liquid |
| State after leaving at 30° C. and 50% RH (*2) | Liquid | Solid | Liquid | Liquid |

TABLE 7

Composition and properties of ink of each of Examples 9 and 10 (unit: %)

|  | Example 9 | Example 10 |
| --- | --- | --- |
| Compound of the formula (4-1) | 5.5 | 5.5 |
| 1,5-pentanediol | 3.0 | 4.5 |
| Glycerin | 7.0 | 5.0 |
| Ethylene glycol | 7.0 | 7.0 |
| Acetylenol E100 | 0.5 | 0.5 |
| Water | 77.0 | 77.5 |
| State after leaving at 25° C. and 50% RH (*1) | Gel | Solid |
| State after leaving at 30° C. and 50% RH (*2) | Liquid | Liquid |

TABLE 8

Composition and properties of ink of each of Comparative Examples 13 to 16 (unit: %)

|  | Comparative Example 13 | Comparative Example 14 | Comparative Example 15 | Comparative Example 16 |
| --- | --- | --- | --- | --- |
| Compound of the formula (4-1) | 5.5 | 5.5 | 5.5 | 5.5 |
| 1,5-pentanediol | 2.0 | 20 | — | — |
| Glycerin | 8.0 | — | 20 | — |
| Ethylene glycol | 7.0 | — | — | 20 |
| Acetylenol E100 | 0.5 | 0.5 | 0.5 | 0.5 |
| Water | 77.0 | 74.0 | 74.0 | 74.0 |
| State after leaving at 25° C. and 50% RH (*1) | Liquid | Solid | Liquid | Liquid |
| State after leaving at 30° C. and 50% RH (*2) | Liquid | Solid | Liquid | Liquid |

(Evaluation of Ink)

The following test was performed by using a thermal inkjet printer for ejecting an ink by applying thermal energy (reconstructed apparatus of a PIXUS 950i (trade name) manufactured by Canon Inc.) with a cyan ink position filled with any one of the above-mentioned inks. It should be noted that an ink jet head was provided with a temperature sensor and temperature adjusting (i.e., heating) means in such a manner that an ink temperature at the time of ejection would always be 30° C. or higher.

(Ejection Stability)

The printer mounted with any one of the above-mentioned inks was left under an environment having a temperature of 25° C. and a relative humidity of 50% for 5 hours or longer. After that, under the same environment, a certain nozzle was caused to eject an ink droplet. Then, the nozzle was caused to stop ejecting for 5 seconds. After that, the nozzle was caused to eject an ink droplet again, whereby an ink was applied to a recording medium (trade name: HR-101; manufactured by Canon Inc.). The resultant recorded article was visually observed and evaluated for quality on the basis of the following criteria. Table 9 below shows the results of the evaluation.

○: Normal recording can be performed.

Δ: A letter is slightly disturbed.

×: There is a nozzle ejecting no ink, or a letter is disturbed.

TABLE 9

Results of evaluation

| | Ejection stability | Formula for coloring material | 1,5-pentanediol | Ink properties |
|---|---|---|---|---|
| Example 1 | ○ | (1-1) | Contained | Solid → liquid |
| Example 2 | ○ | | Contained | Solid → liquid |
| Comparative Example 1 | x | | Contained | Liquid → liquid |
| Comparative Example 2 | x | | Contained | Solid → solid |
| Comparative Example 3 | x | | Absent | Liquid → liquid |
| Comparative Example 4 | x | | Absent | Liquid → liquid |
| Example 3 | ○ | (2-1) | Contained | Solid → liquid |
| Example 4 | ○ | | Contained | Solid → liquid |
| Comparative Example 5 | x | | Contained | Liquid → liquid |
| Comparative Example 6 | x | | Contained | Solid → solid |
| Comparative Example 7 | x | | Absent | Liquid → liquid |
| Comparative Example 8 | x | | Absent | Liquid → liquid |
| Example 5 | Δ | (3-1) | Contained | Gel → liquid |
| Example 6 | ○ | | Contained | Solid → liquid |
| Example 7 | ○ | | Contained | Solid → liquid |
| Example 8 | ○ | | Contained | Solid → liquid |
| Comparative Example 9 | x | | Contained | Liquid → liquid |
| Comparative Example 10 | x | | Contained | Solid → solid |
| Comparative Example 11 | x | | Absent | Liquid → liquid |
| Comparative Example 12 | x | | Absent | Liquid → liquid |
| Example 9 | Δ | (4-1) | Contained | Gel → liquid |
| Example 10 | ○ | | Contained | Solid → liquid |
| Comparative Example 13 | x | | Contained | Liquid → liquid |
| Comparative Example 14 | x | | Contained | Solid → solid |
| Comparative Example 15 | x | | Absent | Liquid → liquid |
| Comparative Example 16 | x | | Absent | Liquid → liquid |

The results described above have revealed that the ink of the present invention is excellent in ejection stability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present application claims the priority of the Japanese Patent Application No. 2005-199805 filed on Jul. 8, 2005, the contents of which is incorporated herein by reference.

What is claimed is:

1. A liquid ink for ink jet comprising:
   water;
   a coloring material;
   1,5-pentanediol; and
   a humectant,
   wherein the coloring material comprises at least one compound represented by the following formula (1):

Formula (1)

where M's each represent an alkali metal or ammonium, l=0 to 2, m=1 to 3, and n=1 to 3, provided that l+m+n=3 to 4, and a substitution position of a substituent comprises 4- or 4'-position; and wherein the liquid ink for ink jet gels or solidifies if it is left under an environment having a temperature of 25° C. and a humidity of 50% RH until substantially no change in weight occurs, and the gelled or solidified ink for ink jet liquefies after being left under an environment having a temperature of 30° C. and a humidity of 50% RH for 24 hours.

2. An ink jet recording method comprising a step of ejecting an ink from an ink jet head to apply the ink to a recording medium, wherein the ink comprises a liquid ink according to claim 1.

3. An ink jet recording method according to claim 2, wherein energy for ejecting the ink is thermal energy.

* * * * *